United States Patent [19]

Deibel

[11] Patent Number: 5,024,761
[45] Date of Patent: Jun. 18, 1991

[54] HIGH-STRENGTH QUICK-DISCONNECT TUBE FILTER

[76] Inventor: Richard J. Deibel, 501 Pine St., Bamberg, S.C. 29003

[21] Appl. No.: 470,052

[22] Filed: Jan. 25, 1990

[51] Int. Cl.$^5$ .............................................. B01D 27/08
[52] U.S. Cl. .................................... 210/232; 210/441; 210/446; 210/454; 55/510
[58] Field of Search .................. 210/232, 446, 497.01, 210/497.1, 447, 130, 441, 454, DIG. 17; 55/490, 492, 508, 510, 519

[56] References Cited

U.S. PATENT DOCUMENTS

| | | | |
|---|---|---|---|
| 3,932,153 | 1/1976 | Byrns | 210/446 |
| 3,941,573 | 3/1976 | Chapel | 210/446 |
| 4,361,483 | 11/1982 | Pall | 210/446 |
| 4,575,422 | 3/1986 | Zimmer | 210/446 |
| 4,601,820 | 7/1986 | Leason | 210/446 |
| 4,610,783 | 9/1986 | Hudson | 210/446 |
| 4,685,472 | 8/1987 | Muta | 210/446 |
| 4,689,144 | 8/1987 | Holmes | 210/446 |
| 4,725,354 | 2/1988 | Thomsen et al. | 210/440 |
| 4,764,275 | 8/1988 | Robichaud | 210/440 |
| 4,834,885 | 5/1989 | Misgen et al. | 210/440 |
| 4,855,047 | 8/1989 | Firth | 210/440 |

*Primary Examiner*—Robert A. Dawson
*Assistant Examiner*—Wanda L. Millard

[57] ABSTRACT

A cylindrical high-strength quick-disconnect disposable tube filter comprised of an external housing and an interior filtering element in a single unitary design. The external filter housing is designed and manufactured utilizing metal tubing and metal endcap closures. The sealed structural end covers of the tube filter housing are formed by folding an end portion of the metal tube over the peripheral lip of the metal endcaps and circumferentially welding the two pieces. Fluid communicating ports are provided in each endcap for inline flow applications.

5 Claims, 2 Drawing Sheets

HIGH-STRENGTH QUICK-DISCONNECT TUBE FILTER

CROSS REFERENCE TO RELATED APPLICATIONS

Invention
High-Strength Disposable Tube Filter and Head Therefor—"Rotomax"
High-Strength Spin-On Tube Filter—"Dei-Max"
Inventor
Richard Jefferson Deibel—U.S. citizen
501 Pine Street
Bamberg, S.C. 29003
(803) 245-4038
Date
Jan. 22, 1990

RELATIONSHIP OF INVENTIONS

Three applications by Deibel, dated Jan. 22, 1990, are for separately and individually unique tube filter products. Each invention commonly incorporates a new state of the art disposable tube filter housing constructed in a configuration applicable to specifically defined markets and applications.

TECHNICAL FIELD

The present tube filter invention relates generally to spin-on, twist-on, and quick-change fluid filtering devices for inline application. More particularly, this invention is a state of the art high-strength disposable tubular filter having quick-disconnect engagement fittings constructed by folding the end portions of a metal tube over the peripheral lip of structural metal endcaps wherein a circumferential weld consolidates and seals the cylindrical filter housing forming a pressure vessel. Furthermore, this invention utilizes a single common structural metal endcap for the closed end of the vessel and for the closed endcap of the internal filtering element. Male quick-disconnect fittings of a standard configuration at the inlet and outlet ports facilitate a fast tool-free installation.

BACKGROUND ART

Spin-on, twist-on, quick-change disposable type filters are used in numerous liquid and pneumatic applications thoughout the agricultural, commercial and industrial market places. Prior art disposable filters require an associated mounting and/or fluid distribution head assembly. Most of these filter products are manufactured utilizing a housing can made by deep-draw forming thin gauge malleable metals. This design limits the performance capabilities of current spin-on, twist-on, type disposable products to the present production technologies of the metal forming industry and to the molecular characteristics of a limited number of specific malleable metals. Prior art uses a stamped steel or cast cover plate to secure the housing to a mounting and distribution head assembly wherein this plate typically has a threaded center hole and is welded and/or crimp sealed to a can to form the filter housing. These techniques for sealing and connecting the can to the plate, plus the structural limits of thin gauge malleable metals, generally restrict the applicational uses of prior art spin-on, twist-on, disposable filters. Some new high pressure, high-strength, disposable filter housings have been developed for some narrowly defined markets and applications. However, even these newer high-strength filters remain applicationally limited to typically the 1,000 psi burst range because of the use of deep-drawn thin gauge metal cans.

Another typical design common to prior art spin-on, twist-on, disposable type filters is the necessity of installing a separate filter element in conjunction with various separator devices, in a housing can. A separate and segregated internal filter element cartridge is subject to different cyclical operational loads than those experienced by the filter housing. Most current internal filter cartridge designs do not properly protect against seal distortion or wear deterioration caused by application flow dynamics and vibration. Such seal distortion and wear deterioration lessens a filters contamination removal efficiency by allowing contaminated fluid to by-pass the filter medium.

Examples of prior art limitations can be found in U.S. Pat. No. 4,719,012, U.S. Pat. No. 4,743,374 (issued as an improvement over U.S. Pat. No. 4,369,113), and U.S. Pat. No. 4,735,716 which offer varying degrees of high-strength and quick-change capability. Two of these designs incorporate the continued use of deep-drawn thin gauge malleable metal cans, with all three requiring a separate internal filtering element. Even though burst pressure ratings are in the 1,000 psi range, prior art filter designs continue to leave a major product void in the spin-on, twist-on, quick-change high-strength disposable filter market.

A need exists for a structurally improved spin-on, twist-on quick-change, quick-disconnect type disposable filter with higher pressure capability, a better fatigue rating, a design that eliminates the need for a separate and segregated internal filter cartridge, and a filter product that decreases by-passing fluid losses caused by distorted or deteriorated internal element seals. The present tube filter invention is designed to overcome one or more of the problems as set forth above.

SUMMARY OF THE INVENTION

The present high-strength quick-disconnect tube filter invention is a new and unique product design which overcomes the foregoing limitations associated with the prior art. The filter housing and internal filter element cartridge utilize a single common metal endcap to form a unitary design that provides a rigid bonded support system within the invention thus eliminating the need for springs, spacers, pressure equalization passages, a separate segregated internal filter element, and a fluid distribution head assembly. The use of various guages of metal tubing having varying degrees of structural integrety can permit higher ranges of operating pressures and expanded applicational opportunities. The present inline tube filter invention is a sealed cylindrical metal tube housing constructed by circumferentially welding structural metal endcaps to the inwardly folded ends of a metal tube having a filter element inside. Fluid communicating male quick-disconnect fittings in both ends of the housing provide an inline fluid communication passage through the internal filtering element. The outlet port structural endcap functions as the closed endcap of the internal filter element and the external housing. The internal component of the invention is a cylindrical solid particulate removal filtering element designed to incorporate a variety of, but not limited to, cellulose and micro fiberglass mediums wherein the open end of the internal filtering element has an o-ring seal and a central fluid passage opening provided by a perforated metal support core. The filtering element support core and filtering medium are secured and sealed by adhesive potting materials installed in the open end endcap of the element and the external housing endcap. The internal filtering element o-ring seal seats on the protruding nipple of a unitary fluid communication male quick-disconnect inlet fitting having a single port passage communicating with a plurality of internal fluid passage and a pressure relief valve wherein an opening in the stem section communicates through the internal element with the outlet port when excessive pressure drop occurs across the element. The outlet port is a special male quick-disconnect fitting wherein both inlet and outlet port fittings are welded circumferentially to their respective structural endcap. The quick-disconnect fittings locking configuration can be of any manufacturers design when mated to the corresponding female fitting whereas said configuration is not critical to the practice of the present invention.

BRIEF DESCRIPTION OF DRAWINGS

A better understanding of the invention can be had by reference to the following Detailed Description in conjunction with the accompanying Drawings, wherein.

Sheet 1 to 2.

Sheet 2 of 2.

DETAILED DESCRIPTION

Figure 1:
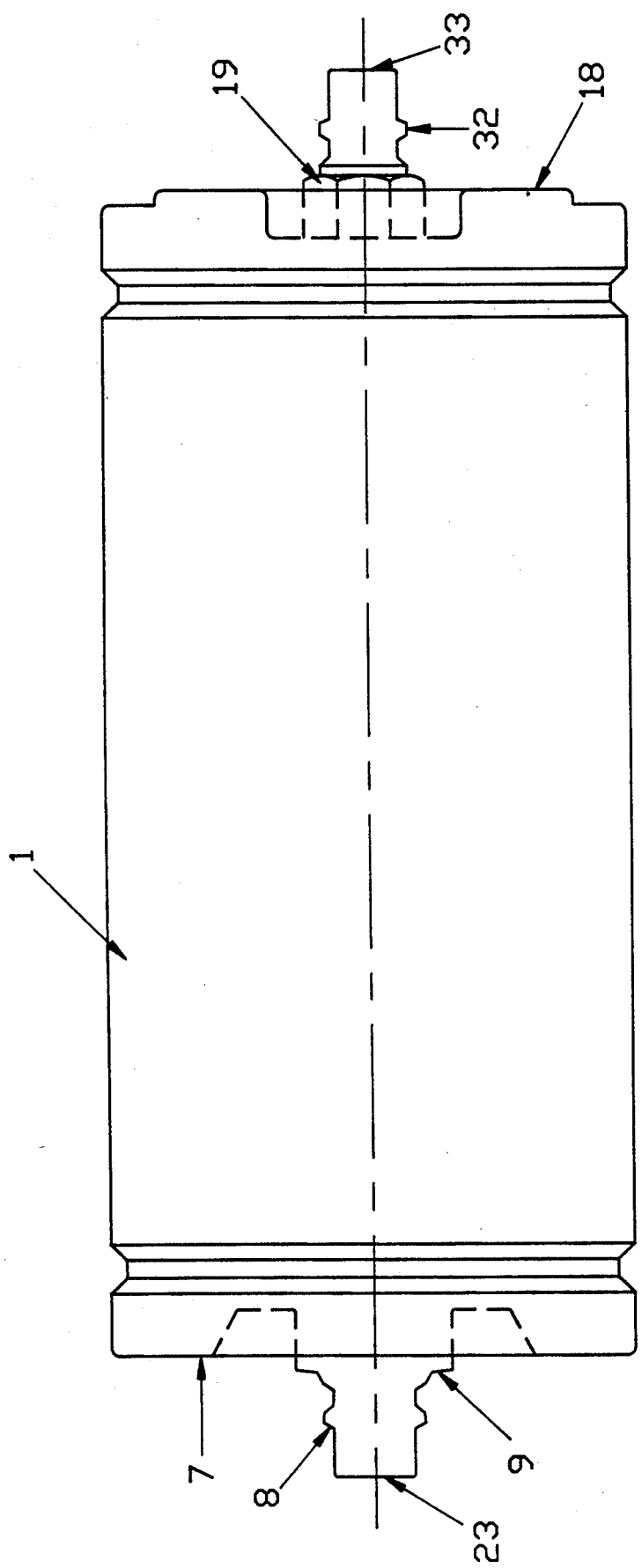
FIG. 1 is a view of an embodiment of the present invention.
Figure 2:
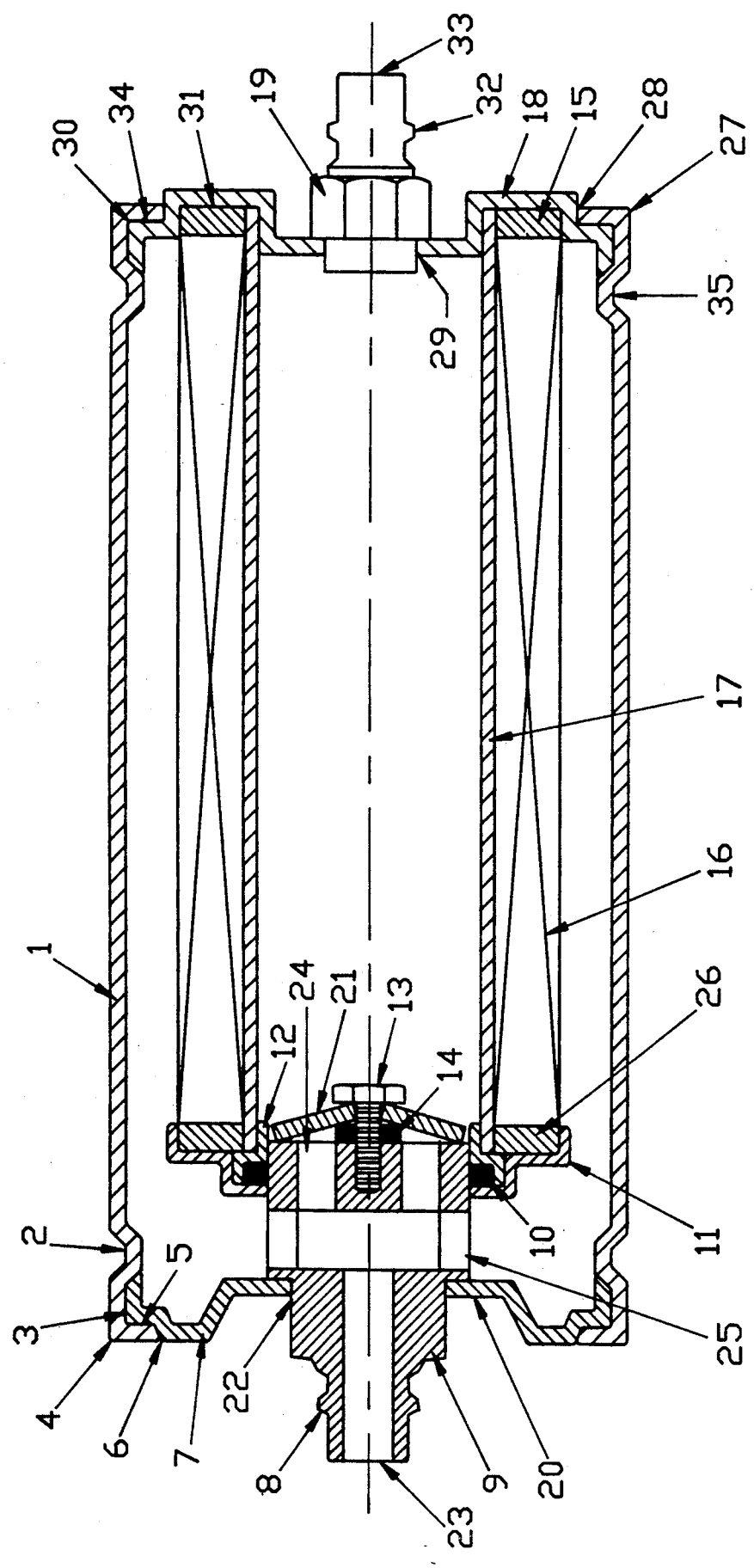
FIG. 2 is a cross-sectional view of the invention.

Referring now to the Drawings, wherein like reference numerials designate like or corresponding elements throughout the views, and particularly referring to FIGS. 1 and 2, there is shown a high-strength quick-disconnect tube filter incorporating a first embodiment of the invention. As will be explained more fully hereinafter, the filter is particularly adaptable for the removal of solid paticulates from hydraulic and lubricating oils in systems or applications operating at higher pressures. The high-strength quick-disconnect tube filter is comprised of components 1,7,9,10,11,12,13,14,15,16, 17,18,19,20,21, and 26 as particularly described in detail in the following explanation as to how each component is incorporated into a unitary constructed tube filter. Preliminary test reults have confirmed the present high-strength quick-disconnect tube filter will endure operating pressures on the order of 1,200 psi and burst pressure generally in the 3,000 psi range. Variations in desired pressure ratings are generally achievable by specifying varying gauges of metal tubing inconjunction with the appropriate structural endcaps. The present filter invention is descriptively referred to as a tube filter specifically because it is constructed utilizing metal tubing 1 as the main stuctural component of the cylindrical housing 1,7,9,18,19 verses a deep-drawn can known in the art. The tube 1 is generally made of metals such as cold steel, stainless steel, aluminum, or other suitable material known in the art to be capable of performing at higher pressures. This variety of readily available metal tubing permits more design flexibility with respect to envelope sizes and applicational requirements than prior art.

The tube filter housing, as FIG. 1, FIG. 2, is comprised of a metal tube 1, two closed endcaps 7,18 wherein on endcap 7 being circumferentially welded 22 to a round shank male quick-disconnect fitting 9 having a single fluid communicating inlet port 23 connecting to a plurality of interior fluid distribution ports 25, a plurality of by-pass ports 24, and concave washer 21 style pressure relief valve 13,14,21, and the other endcap 18 configured having a circumferential receptacle 31 for potting the internal filtering element components, a peripherial lip and retaining wall 30 including a surface area 34 for receiving the inward folded tube wall 27 being circumferentially welded 29 to a hex shank male quick-disconnect fitting 19 having a single fluid communicating outlet port 33. The tube 1 can generally be from a standard variety of tube products consistent with applicational design criteria. Particularly, this invention was tested utilizing an 0.065 wall DOM unannealed steel tube and standard configured 8,32 quick-disconnect fittings by a major supplier.

The inlet end 23 of the housing 1,7,9,18,19 has a structural metal end cap 7 configured in a centrally concave shape 20 having a center opening wherein the before described fluid communicating multi-component male quick-disconnect fitting 9 nipple 8 protrudes outward in conjunction with a recessed surface area 5 for receiving the inward folded 4 tube wall 1 at the peripheral lip and retaining wall 3. The endcap retaining wall 3 abutts the inward formed groove 2 in the tube sidewall 1 wherein the inward groove 2 functions as a positioning and locking groove for production fixturing during manufacturing. The outlet end 33 of the housing 1,7,9,18,19 is configured in the heretofore described shape having a center opening wherein a fluid communicating hex shank male quick-disconnect fitting 19 having a nipple 32 protruding outward to engage a mating fitting is circumferentially welded 29.

The filter housing 1,7,9,18,19 is constructed at the outlet end 33 by inserting endcap 18 into the tube 1 until the endcap 18 firmly engages the inward groove 35 formed in the tube 1 sidewall wherein in the tube 1 wall is folded inward 27 over the peripherial lip and retaining wall 30 flatly engaging the recessed receiving area 34 of the endcap 18 wherein a circumferential weld 28 is placed at the inner most edge of the folded tube 1 wall to consolidate and seal the two components 1,18. The inlet end 23 of the housing 1,7,9,18,19 is constructed by inserting endcap 7 into the tube 1 until the endcap 7 firmly engages the inward groove 2 formed in the tube 1 sidewall wherein the tube wall 1 is folded inward 4 over the peripherial lip and retaining wall 3 flatly engaging the recessed receiving area 5 of the endcap 7 wherein a circumferential weld 6 is placed at the inner most edge of the folded tube 1 wall to consolidate and seal the two components 1,7.

The internal filtering element is centrally positioned in the filter housing being comprises of an endcap 11,12 having a center opening with an o-ring 10 to receive the internal body portion of the round shank male quick-disconnect fitting 9, a perforated core 17, a suitable filtering medium 16 surrounding the core 17, and an adhesive potting material 15,26. The open end of the element is assembled in a fashion known in the art being the core and medium are potted utilizing adhesive in the endcaps. In the present invention the closed endcap 18 being a structural part of the housing functions as the closed endcap 18 of the internal filtering element. This particular method of constructing the internal filtering element as a unitary component of the housing in a critical feature of the present invention. This unitary construction feature results in several positive improvements over prior art, such as; it eliminates the need for separator devises, springs, pressure equalization passages, or spacers; it eliminates the need for a separate internal closed endcap; it stabilizes the internal element against movement caused by application flow variations and vibration; it extends seal life and improves seal performance by protecting the internal element against movement during operation; and among other less immediately recognizable benefits, this construction method improves the solid particulate removal efficiency of the filter medium by stabilizing the element.

From the foregoing, it will thus be apparent that the present invention comprises a unitarily constructed high-strength quick-disconnect tube filter capable of improved performance over prior art in a variety of applications including, but not limited to, high pressure, high-strength, quick change, and/or disposable. Additional advantages will be evident to those skilled in the art.

Although particular embodiments of the invention have been illustrated in the accompanying Drawings and described in the foregoing Detailed Description, it will be understood that the invention is not limited only to the embodiments disclosed, but is intended only to embrace any alternatives, equivalents, modifications and/or rearrangements of filters, filter housings, filter elements, or any part thereof falling within the scope of the present invention as defined by the following claims.

What I claim:

1. A high pressure quick change filter device comprising: a tubular metal housing having first and second ends; first and second metal end caps secured thereto by said housing being folded inwardly over the periphery of each respective said end cap; said first and second end caps including first and second male fittings, respectively; and a tubular filter element disposing internally of the housing between said first and second fittings and bonded to said first end cap.

2. The filter device of claim 1, wherein the edge of the inwardly folded housing engages each said end cap in a recessed receiving area, and is held by a circumferential wel at the innermost edge of the housing.

3. The filter device of claim 1, wherein said second male fitting includes an external portion which comprises a nipple protruding outwardly with a single fluid passage and an internal portion defined by plural passages, and where at least one said plural passage contains a pressure relief valve seated in fluid communication with said filter element center.

4. The filter device of claim 3, wherein the pressure relief valve is a concave washer firmly seated on said male fitting, and said washer is secured by a spacer and locking screw.

5. The filter device of any one of claims 1-4, wherein said filter element comprises a perforated core surrounded by a suitable filtering media, and said filter element is bonded to said first end cap by a potting material.

* * * * *